(12) United States Patent  
Bartonek

(10) Patent No.: US 8,800,362 B2
(45) Date of Patent: Aug. 12, 2014

(54) PRECIPITATION DETECTOR FOR RAILROAD APPLICATIONS

(71) Applicant: Progress Rail Services Corporation, Albertville, AL (US)

(72) Inventor: Mark Joseph Bartonek, Inchep, MO (US)

(73) Assignee: Progress Rail Services Corp, Albertville, AL (US)

( * ) Notice: Subject to any disclaimer, the term of this patent is extended or adjusted under 35 U.S.C. 154(b) by 43 days.

(21) Appl. No.: 13/719,439

(22) Filed: Dec. 19, 2012

(65) Prior Publication Data

US 2014/0165717 A1    Jun. 19, 2014

(51) Int. Cl.
    *G01W 1/00* (2006.01)
(52) U.S. Cl.
    USPC .............. 73/170.21; 73/170.17; 324/644
(58) Field of Classification Search
    None
    See application file for complete search history.

(56) References Cited

U.S. PATENT DOCUMENTS

| | | | |
|---|---|---|---|
| 3,836,846 A * | 9/1974 | Overall et al. | 324/643 |
| 3,882,381 A | 5/1975 | Gregory | |
| 3,974,993 A | 8/1976 | Hammecke | |
| 4,996,493 A | 2/1991 | Monat et al. | |
| 5,652,522 A * | 7/1997 | Kates et al. | 324/644 |
| 6,995,572 B2 * | 2/2006 | Arndt et al. | 324/639 |
| 7,034,257 B2 | 4/2006 | Petrenko | |
| 7,313,963 B2 | 1/2008 | Kuznar | |
| 2002/0156588 A1 * | 10/2002 | Arndt et al. | 702/40 |
| 2011/0135386 A1 * | 6/2011 | Sahota | 404/12 |
| 2012/0085417 A1 | 4/2012 | Arras et al. | |

FOREIGN PATENT DOCUMENTS

DE  102004056134  5/2006
EP  0089215  9/1983

* cited by examiner

*Primary Examiner* — Andre Allen
(74) *Attorney, Agent, or Firm* — Finnegan, Henderson, Farabow, Garrett & Dunner LLP

(57) ABSTRACT

A method for detecting precipitation is disclosed. The method may include receiving a signal from a sensing module positioned in the vicinity of a railroad track, the signal being indicative of a capacitive dielectric property of a form of precipitation that has accumulated in the vicinity of the railroad track. The method may further include processing the signal from the sensing module to determine the type of precipitation that has accumulated in the vicinity of the railroad track as a function of the indicated capacitive dielectric property. The method may still further include sending a signal indicative of a recommended action based on the type of precipitation.

20 Claims, 3 Drawing Sheets

PRECIPITATION DETECTOR FOR RAILROAD APPLICATIONS

TECHNICAL FIELD

The present disclosure relates generally to a precipitation detector and, more particularly, a precipitation detector for railroad applications.

BACKGROUND

Ice buildup and other forms of frozen and unfrozen precipitation on the rails of a railroad track can have an adverse effect on traction of a train, as well as creating other potential problems with track switches. Monitoring systems for the railroad industry provide methods and apparatus for detecting an accumulation of snow or ice around a track switch that may result in blockage of a moving part of the switch or other malfunction of the switch. Electrical heating elements are arranged on rail sections that include a track switch, with the temperature or detection of accumulation of snow controlling the operation of a regulator, which in turn regulates the temperature of the heated rail section.

One problem associated with existing precipitation monitoring systems is that the height of the snow detected by the sensor may not correspond accurately enough to the snow accumulation on the track switch. Existing snow sensors may also have the problem that they operate upon the basis of a resistance change between two electrodes, or upon the basis of a change in the inductance of a sensing coil. As a result, existing snow sensors may respond not only to snow but also to dirt, dust and other foreign objects that come into contact with the sensors One attempt to overcome some of the problems with existing snow sensors is disclosed in U.S. Pat. No. 3,974,993 of Hammecke that issued on Aug. 17, 1976 (the '993 patent). The '993 patent provides a capacitive snow-detecting means that includes a snow measuring capacitor with capacitor electrode plates spaced apart to form an open snow accumulator. The '993 patent contends that the change in capacitance undergone by such a measuring capacitor in response to the presence of snow and/or ice intermediate the capacitor electrodes differs markedly from the capacitance change resulting from the introduction of dirt, dust, iron and stone dust, or sand in between the capacitor electrodes.

Although the detection system of the '993 patent may help to reduce the number of false indications of precipitation along the rails, it may be less than optimal. In particular, the '993 patent looks at the height of accumulation of either snow or ice between the electrode plates of the measuring capacitor, and turns on a heater when the height reaches a certain amount. The '993 patent does not distinguish between the different types of possible precipitation, and whether the precipitation is frozen or unfrozen, and furthermore the '993 patent does not provide different control instructions based on different types of precipitation.

The system and method of the present disclosure solves one or more problems set forth above and/or other problems in the art.

SUMMARY

In one aspect, the present disclosure is directed to a precipitation detector that may include a sensing module configured for installation in the vicinity of a railroad track. The sensing module may be configured to detect a capacitive dielectric property of a form of precipitation that has fallen in the vicinity of the railroad track. A processor may be configured to receive a signal from the sensing module indicative of the detected capacitive dielectric property, determine the type of precipitation that has accumulated in the vicinity of the railroad track as a function of the detected capacitive dielectric property, and transmit a signal indicative of a recommended action based on the type of precipitation.

In another aspect, the present disclosure is directed to a method for sensing precipitation along a railroad track. The method may include receiving a signal from a sensing module positioned in the vicinity of the railroad track, the signal being indicative of a capacitive dielectric property of a form of precipitation that has fallen in the vicinity of the railroad track. The method may also include processing the signal from the sensing module to determine the type of precipitation that has accumulated in the vicinity of the railroad track as a function of the indicated capacitive dielectric property. The method may further include transmitting a signal indicative of a recommended action based on the type of precipitation.

DETAILED DESCRIPTION

Figure 1:
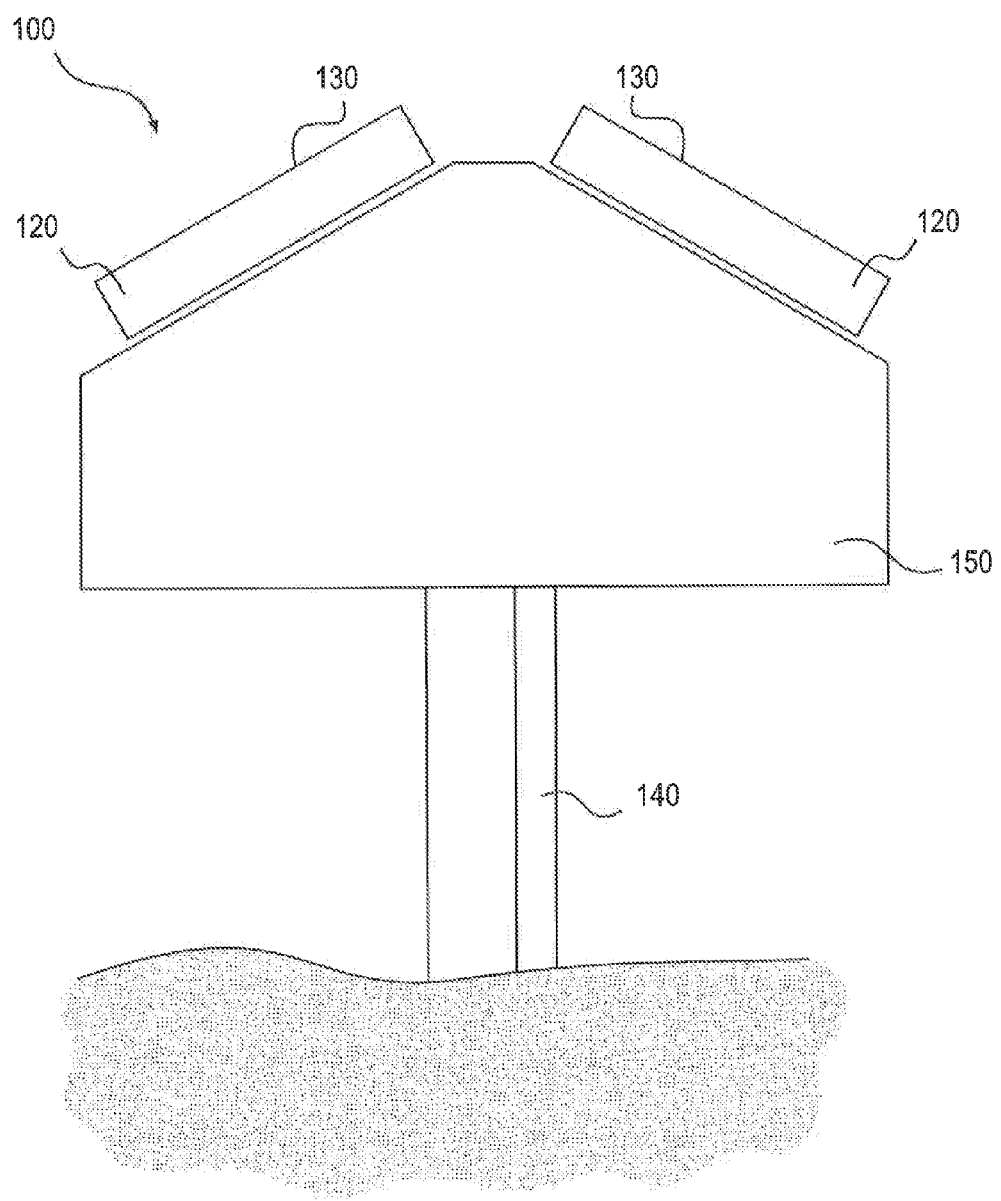
FIG. 1 is a schematic illustration of an exemplary disclosed detector.

Referring initially to FIG. 1, a precipitation detector 100 in accordance with various implementations of this disclosure may include a capacitive sensing device that is configured to detect a dielectric property of a form of precipitation that has fallen in the vicinity of the rails along which a train travels. Precipitation detector 100 may be constructed in various ways including mounting one or more sensing modules 120 on a support structure 150. Support structure 150 may be supported on a post 140 or other support member positioned in close proximity to an area along a train track where precipitation monitoring is desired. One of ordinary skill in the art will recognize that support structure 150 and post 140 may be provided in any number of different configurations to support the one or more sensing modules 120 in an area where the top surface 130 of each sensing module 120 will be exposed to precipitation and positioned to collect the precipitation. Although support structure 150 in FIG. 1 is illustrated as supporting sensing modules 120 at an angle to horizontal, it is also contemplated that sensing modules 120 may be supported in substantially horizontal orientations, or at other angles relative to the surrounding terrain. Support structure 150 may also be provided with heating elements, blowers, or other accessories (not shown) to provide means for automatically clearing precipitation off of the top surface 130 on each sensing module 120.

Figure 2:
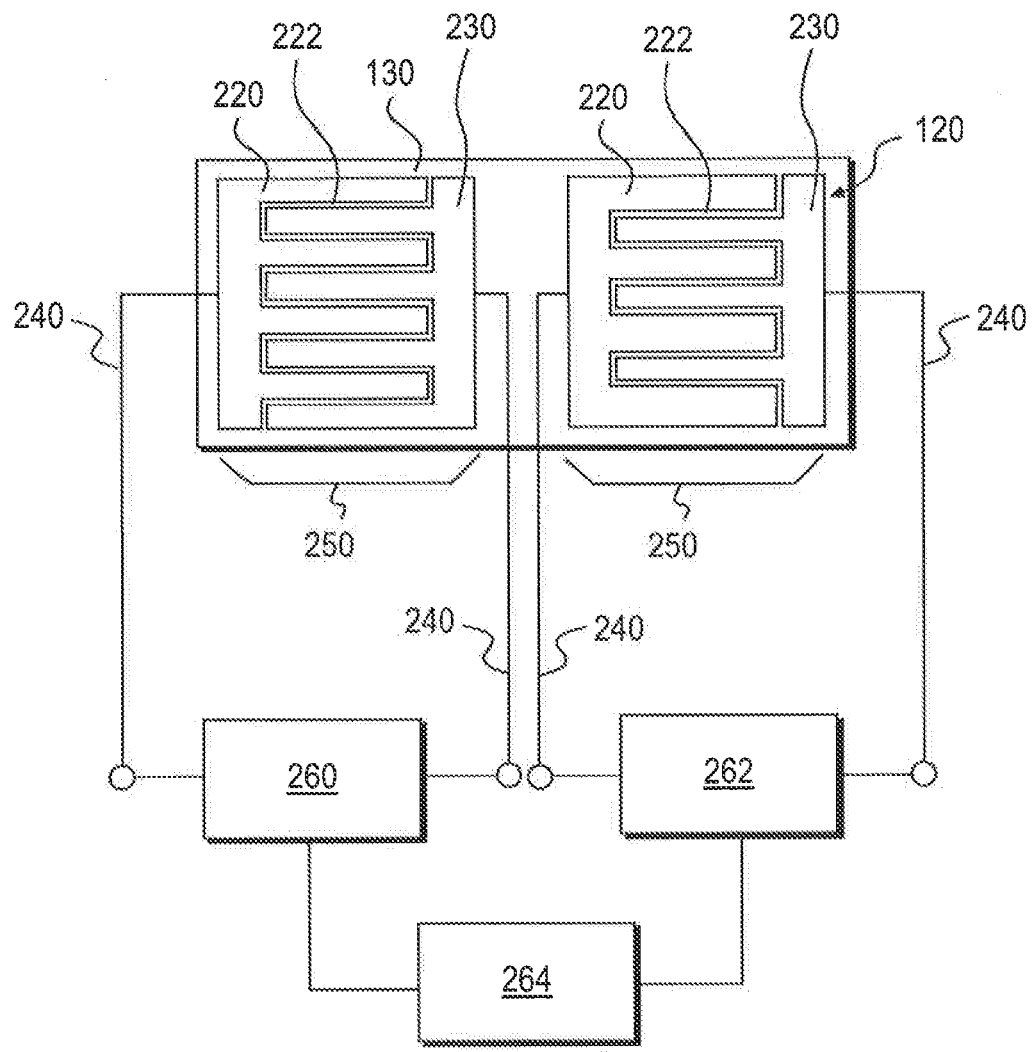
FIG. 2 is a schematic illustration of a sensing module used with the exemplary disclosed detector of FIG. 1.

Referring to FIG. 2, each sensing module 120 may be provided with one or more capacitors 250 on top surface 130. Capacitors 250 may be configured such that the dielectric properties of each capacitor 250 change depending on the type of precipitation accumulating on top surface 130 of each sensing module 120. One possible configuration for capacitors 250 is illustrated in FIG. 2, although one of ordinary skill in the art will recognize that conductive sensing elements may be arranged in other patterns or configurations on sensing modules 120, with spaces left between the conductive sensing elements for accumulation of various types of precipitation. Conductive sensing elements, such as the interdigitated electrodes 220, 230 illustrated in FIG. 2, may be formed as part of one or more printed circuit boards, or otherwise etched, machined, formed, or deposited onto a substrate in the desired pattern. The presence of precipitation such as water, frost, sleet, snow, or ice on top surface 130 in the area of interdigitated electrodes 220, 230, affects the dielectric properties of capacitors 250. FIG. 2 illustrates one possible configuration with interdigitated electrodes 220, 230 formed on top surface 130 of sensing modules 120. Spaces 222 between interdigitated electrodes 220, 230 may define an area for accumulation of various types of precipitation, which may then contribute to the dielectric properties of each capacitor 250, and affect a signal 240 output by each capacitor 250.

Each sensing module 120 may be configured to provide a signal 240 to known circuitry (not shown), firmware, software, or some combination thereof, with signal 240 indicative of both the quantity and the type of precipitation accumulating on top surface 130. The dielectric properties of various forms, states, and types of precipitation such as rain, frost, sleet, ice, and snow differ from each other such that each type of precipitation can be distinguished from the other based on respective dielectric properties. Frozen precipitation such as ice will have different dielectric properties than unfrozen precipitation such as rain, and the differences in the dielectric properties of water, frost, snow, sleet, ice, and other forms of precipitation allow sensing modules 120 to output different signals indicative of each different type of precipitation, as well as identifying the quantity of precipitation that has accumulated.

There are a number of different ways in which the signals 240 may be processed by control circuits or processors 260, 262, 264. Signals 240 of the same or different frequency, amplitude, or phase may be input by signal generators (not shown) associated with processors 260, 262, 264 to one or more of electrodes 220, 230, and individual or composite signals that result at the other of associated and interdigitated electrodes 220, 230 may then be processed at processors 260, 262, 264 to provide different outputs depending on the precipitation that has fallen onto top surfaces 130. In some implementations signals received from one or more capacitors 250 located on top surface 130 of one sensing module 120 may be processed by processor 260 and then compared to signals received from one or more capacitors located in different positions on the same sensing module 120, or on a different sensing module 120 with the same or different exposure to precipitation. Processors 260, 262 may be configured to receive signals 240 from capacitors 250, and processor 264 may be configured to combine signals received from processors 260, 262 into a composite signal.

In certain implementations of this disclosure, when top surface 130 of a sensing module 120 in a first location is covered with water, ice, or some other form of precipitation, the dielectric constant and thus the capacitance of one or more capacitors 250 on sensing module 120 may increase. At the same time the capacitance of another capacitor 250 on a different sensing module 120 at a different location and having a different exposure to precipitation may provide a reference signal, or a signal indicative of a trend in precipitation. Processors 260, 262 may be configured to process signals 240 received from different capacitors 250 by inverting the signal received from one or more capacitors 250 in order to convert the signals into signals that are 180 degrees out-of-phase with non-inverted signals received from other capacitors 250. Processors 260, 262 may also be configured to adjust amplitudes or other parameters of one or more signals input to or received from capacitors 250. Processor 264 may be configured to combine signals received from processors 260, 262 into a composite signal indicative of type and quantity of precipitation. In some implementations a signal from a capacitor 250 that is not exposed to precipitation may be combined with an inverted and 180 degree out-of-phase signal from another capacitor 250 that is exposed to precipitation. The signals will effectively cancel each other out when neither capacitor 250 is sensing a change in dielectric properties resulting from an accumulation of precipitation.

The dielectric constants of various forms of precipitation may vary with frequency. The generally accepted dielectric constant of water is about 78 at a temperature of 25 degrees C. at a wide range of frequencies. However, the dielectric constants of different forms of precipitation may exhibit a wider variance at different frequencies. For example, while the dielectric constant of water and ice may be substantially the same at low frequencies, the dielectric constant of ice may decrease as the frequency is increased while that of water may remain the same within limits. Ice, as well as water, is made up of polar molecules, and ice has a high dielectric constant at low frequencies. However, as the electrical frequency is increased, the onset of dielectric relaxation and consequent decrease in dielectric constant occurs at a lower frequency in ice than in water. The frequency range over which the dielectric constant of ice shows a notable decrease may also be somewhat dependent on temperature. For temperatures in approximately the range from 0 degrees F. to 10 degrees F., the dielectric constant of ice may decrease as the frequency increases from 2 Khz to 50 Khz. Therefore, if top surface 130 is covered with ice, a resultant composite signal generated by processor 264 may be present, but a lower frequency composite signal may be stronger than a higher frequency composite signal because the dielectric constant of ice decreases with increasing frequency. Adjusting the frequency of signals 240 input to an electrode 220, 230 on a capacitor 250 may therefore increase the sensitivity of sensing modules 120 for detection of precipitation.

Processors 260, 262, 264 may be further configured to process signals received from capacitors 250, and compare the resulting indications of the types of precipitation and amount of precipitation with threshold values and/or a library or database of instructions tailored for each potential type and quantity of precipitation. Processor 260, 262, 264 may also be configured to send different control action instructions specific to each type of precipitation and dependent upon the quantity of the particular type of precipitation. Processors 260, 262, 264 may be configured to send control action instructions that may include activating a heater in an area where frozen precipitation could present a problem, sending instructions to a dispatch station providing a warning of potentially hazardous weather conditions, or activating an alarm on board a train to provide the train operator with current and possibly trending information regarding accumulating precipitation. Precipitation detector 100 and associated processors 260, 262, 264 may also be tied into an existing signal system for an existing hot box detector (HBD) or existing hot wheel detector (HWD) provided at one or more monitoring stations along a railroad track. The control instructions may be communicated to remote dispatch stations, directly to an operator on a train, or to other locations through wired or wireless communication networks. In addition, processors 260, 262, 264 may be configured to identify trends in the types of precipitation and quantity of precipitation detected as a result of comparing signals received from successive capacitors 250 on each sensing module 120, and/ or one or more capacitors 250 included on successive precipitation detectors 100 positioned along a railroad track, at railroad crossings, or in train switching yards.

One of ordinary skill in the art will recognize that although processors 260, 262, 264 in FIG. 2 are illustrated as separate units, the functionality provided by each of these processors could be provided instead by one or more processors. The one or more processors may be part of a server, client, network infrastructure, mobile computing platform, or a stationary computing platform, one or more of which may be contained in a dispatch office, on the train, in a single wayside housing, multiple wayside housings, or at remote locations communicatively coupled over wired or wireless networks.

Figure 3:
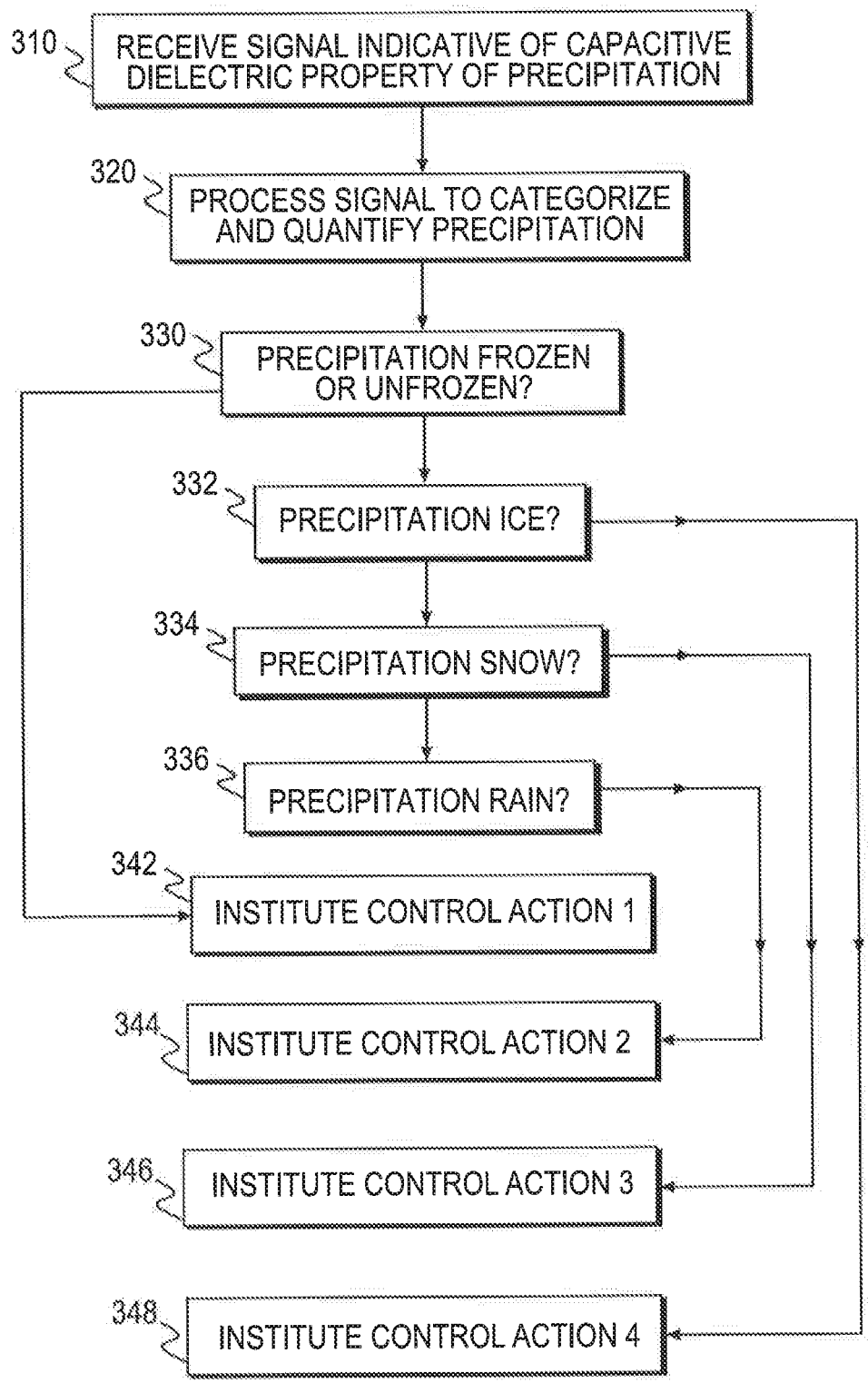
FIG. 3 is a flowchart depicting an exemplary disclosed precipitation detection method that may be performed by the detector of FIG. 1.

FIG. 3 is a flowchart depicting an exemplary disclosed method that may be performed by the precipitation detector of FIG. 1. FIG. 3 will be discussed in more detail below to further illustrate the disclosed concepts.

INDUSTRIAL APPLICABILITY

The disclosed exemplary method for detecting precipitation may overcome limitations encountered with existing precipitation detectors by distinguishing between different types and states of precipitation such as rain, frost, sleet, snow, and ice, identifying the quantity of precipitation, and/or trends in the quantities and types of accumulating precipitation at various locations where the precipitation detectors are positioned, and by providing specific control action instructions that are tailored for the specific type and quantity of precipitation detected.

As shown in FIG. 3, at step 310 a signal may be received that is indicative of the capacitive dielectric property of precipitation that has fallen on precipitation detector 100. At step 320, the signal may be processed to categorize and/or quantify the precipitation.

At step 330, a determination may be made as to whether the precipitation is in a frozen state, or an unfrozen state. Because of the above-discussed differences in behavior of the dielectric constant of water and ice at different frequencies, a determination that the precipitation is frozen may also include an adjustment to the frequency of signals input to the electrodes of capacitive precipitation detector 100. At step 332, a determination may be made as to whether the precipitation is ice. At step 334, a determination may be made as to whether the precipitation is snow. At step 336, a determination may be made as to whether the precipitation is rain.

At step 342, based on the determination from step 330 whether the precipitation is frozen or unfrozen, a first control action may be instituted. At step 344, based on the determination from step 336 whether the precipitation is rain, a second control action may be instituted. At step 346, based on the determination from step 334 whether the precipitation is snow, a third control action may be instituted. At step 348, based on the determination from step 332 whether the precipitation is ice, a fourth control action may be instituted.

One of ordinary skill in the art will recognize that not all of the determinations illustrated in FIG. 3 have to be made in all situations. Additionally, the order in which the determinations are made may be varied, or certain determinations may be eliminated. The various control actions that may be instituted may also overlap, or even have common characteristics or parameters under certain situations and for certain types or quantities of precipitation.

It will be apparent to those skilled in the art that various modifications and variations can be made to the disclosed precipitation detector without departing from the scope of the disclosure. Other embodiments of the precipitation detector will be apparent to those skilled in the art from consideration of the specification and practice of the method disclosed herein. It is intended that the specification and examples be considered as exemplary only, with a true scope of the disclosure being indicated by the following claims and their equivalents.

What is claimed is:

1. A precipitation detector, comprising:
   a sensing module configured for installation in the vicinity of a railroad track, the sensing module being configured to detect a capacitive dielectric property of a type of precipitation that has accumulated in the vicinity of the railroad track; and
   a processor configured to receive a signal from the sensing module indicative of the capacitive dielectric property, determine the type of precipitation that has accumulated in the vicinity of the railroad track as a function of the capacitive dielectric property, and transmit a signal indicative of a recommended action based on the type of precipitation.

2. The precipitation detector of claim 1, wherein the processor is further configured to determine an approximate amount of precipitation that has accumulated in the vicinity of the railroad track as a function of the capacitive dielectric property.

3. The precipitation detector of claim 1, wherein the sensing module includes one or more capacitors.

4. The precipitation detector of claim 3, wherein each of the one or more capacitors includes two or more interdigitated electrodes with spaces between the interdigitated electrodes configured to contribute to dielectric properties of the one or more capacitors.

5. The precipitation detector of claim 3, wherein the one or more capacitors are arranged on a top surface of the sensing module.

6. The precipitation detector of claim 1, wherein the sensing module is mounted on a support structure in close proximity to the railroad track.

7. The precipitation detector of claim 5, wherein the top surface is positioned to collect precipitation in the vicinity of the railroad track.

8. The precipitation detector of claim 1, wherein the processor is configured to process signals received from a plurality of capacitors.

9. The precipitation detector of claim 8, wherein the processor is configured to combine the signals received from the plurality of capacitors into a composite signal indicative of the type of precipitation that has fallen in the vicinity of the railroad track.

10. The precipitation detector of claim 1, wherein the processor is configured to supply an input signal to the sensing module and vary a frequency of the input signal to change the capacitive dielectric property of a form of precipitation detected by the sensing module.

11. A method for detecting precipitation, the method comprising:
   receiving a signal from a sensing module positioned in the vicinity of a railroad track, the signal being indicative of a capacitive dielectric property of a type of precipitation that has accumulated in the vicinity of the railroad track;
   processing the signal from the sensing module to determine the type of precipitation that has accumulated in the vicinity of the railroad track as a function of the capacitive dielectric property; and
   sending a signal indicative of a recommended action based on the type of precipitation.

12. The method of claim 11, further including:
processing the signal from the sensing module to determine the approximate amount of precipitation as a function of the capacitive dielectric property.

13. The method of claim 11, wherein processing the signal from the sensing module includes determining whether the precipitation is frozen or unfrozen.

14. The method of claim 11, wherein processing the signal from the sensing module includes determining whether the precipitation is ice.

15. The method of claim 11, wherein processing the signal from the sensing module includes determining whether the precipitation is snow.

16. The method of claim 11, wherein processing the signal from the sensing module includes determining whether the precipitation is rain.

17. The method of claim 11, wherein sending a signal indicative of a recommended action includes sending control action instructions to turn on a heater.

18. The method of claim 11, wherein sending a signal indicative of a recommended action includes sending a warning of potentially hazardous weather conditions.

19. The method of claim 11, wherein processing the signal from the sensing module includes comparing the type of precipitation with one or more of a library or database of instructions tailored for each potential type of precipitation.

20. A method of detecting precipitation, the method comprising:
receiving a signal from a sensing module positioned in the vicinity of a railroad track, the signal being indicative of a capacitive dielectric property of a type of precipitation that has accumulated in the vicinity of the railroad track;
processing the signal from the sensing module to determine the type of precipitation and amount of precipitation that has accumulated in the vicinity of the railroad track as a function of the capacitive dielectric property, wherein processing the signal from the sensing module includes comparing the type of precipitation and amount of precipitation with one or more of a threshold value or a library or database of instructions tailored for each potential type and amount of precipitation; and
sending a signal indicative of a recommended action based on the type of precipitation and amount of precipitation.

* * * * *